INVENTOR.
JOHN O. HRUBY, JR.
BY
Christie, Parker & Hale
ATTORNEYS.

United States Patent Office 3,406,715
Patented Oct. 22, 1968

3,406,715
DRAIN VALVE
John O. Hruby, Jr., Burbank, Calif., assignor to Rain Jet Corporation, Burbank, Calif., a corporation of California
Filed Oct. 4, 1965, Ser. No. 492,597
5 Claims. (Cl. 137—550)

ABSTRACT OF THE DISCLOSURE

A drain valve for an underground lawn sprinkling system including a housing defining a fluid flow passage fitted with an annular spherically curved valve seat opening concave toward an inlet end of the passage adapted to be connected to a liquid flow duct of the sprinkling system. A foraminous member is disposed across the passage adjacent each end thereof. The valve includes a substantially hemispherical valve member disposed in the passage between the valve seat and the inlet end of the passage, the valve member being oriented convex toward the outlet end of the passage and movable along the passage into and out of sealing relation with the valve seat. The valve member has an essentially flat surface opposite from the seat disposed essentially normal to the length of the passage. A coil spring is engaged between the valve member and the housing for urging the valve member away from the valve seat when the static pressure of fluid presented to the inlet end of the passage is less than a predetermined amount greater than the pressure of fluid communicated to the outlet end of the passage. The spring also guides movement of the valve member toward and away from the valve seat so that the valve member engages the housing only at the valve seat. The valve closes with a smaller pressure differential across the valve member than the pressure differential which exists at the time the valve opens.

---

Figure 1:
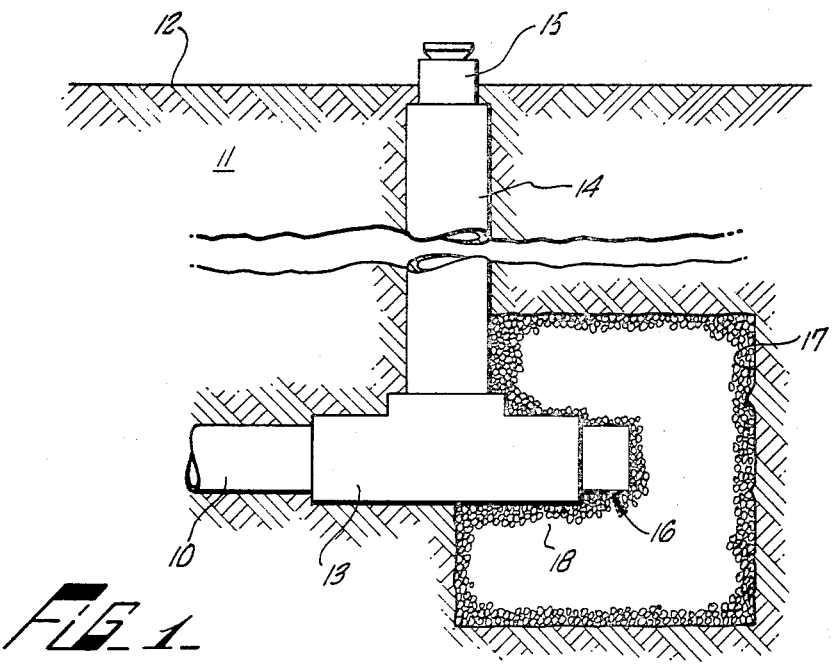

This invention relates to drain valves. More specifically, it relates to a valve which operates automatically to drain a liquid distribution system to which it is coupled when no liquid is supplied to the system.

It is desired that an underground lawn sprinkling system be provided with a drain valve at about the lowest point in the system so that the system may be drained when desired. Drain valves are particularly important where ground in which the system is located may freeze; if no provision were made for draining the system during the winter, the water pipes in the system could burst because of the forces generated by water freezing in the pipes. Further, because valves which require manual operation are not desired since they either require a valve stem extending through the lawn or can be operated only after removing a portion of the lawn, the drain valve must be automatically operated if the valve is to be commercially acceptable. Accordingly, there now exists in the marketplace a number of spring-loaded drain valves which open to drain water supply pipes of an underground lawn sprinkling system, for example, when water pressure in the pipe falls below a predetermined level, as when the main water control valve for the system is closed.

Existing drain valves for underground lawn sprinkling systems all show at least one of several disadvantages characteristics in use. Existing valves, particularly drain valves of the type using spring-biased cylindrical valve members, commonly jam open, thereby producing an undesired leak in the system causing a waste of water and drowning of the lawn in the vicinity of the valve. Also, existing drain valves are subject to clogging by sand or other foreign particles; such particles may cause the valve to jam open. Other drain valves require that water pressures of about 15 pounds per square inch be applied to them before they close. Such a pressure value is common in a water main, but it is rarely encountered in remote locations of an underground sprinkling system because of the head loss encountered in the system piping between the valve and the main. In practice, drain valves responsive to high pressures rarely operate as intended.

This invention provides a simple, inexpensive, effective and efficient drain valve which is especially suited for use in inaccessible locations of underground lawn sprinkling systems and the like. The valve is responsive to low pressure differentials and has the feature that it opens at higher pressures than it closes. Also, the valve cannot become jammed when open.

Generally speaking, this invention provides a drain valve for use in underground lawn sprinkling systems and the like. The valve includes a housing having a liquid flow passage through it and an annular valve seat circumferentially of the passage and opening toward one end of the passage. The housing carries coupling means adapting the housing for connection to a liquid flow conduit so that the one end of the passage communicates with the conduit. A foraminous filter member is disposed across each end of the passage. A valve member is disposed in the passage between the valve seat and the one end of the passage. The valve member is curved convex toward the other end of the passage. The valve member is movable axially of the passage into and out of engagement with the valve seat. A coil spring is engaged between the valve member and the housing for urging the valve member away from the valve seat when the one end of the bore communicates with liquid having a pressure less than a predetermined amount greater than the pressure of liquid in communication with the other end of the passage. The spring also functions to guide the valve member in its movement toward and away from the valve seat.

Figure 2:
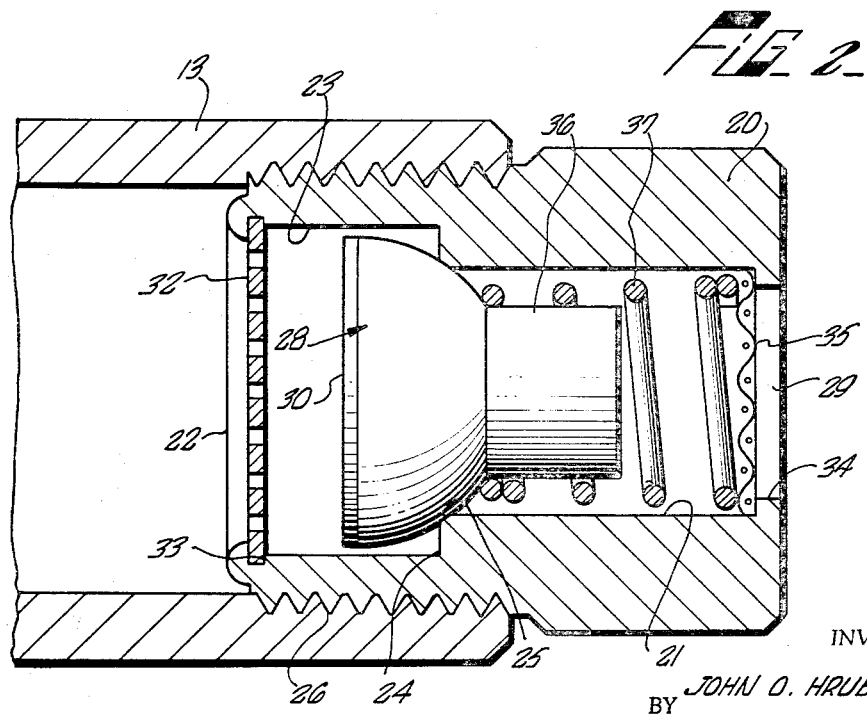

The above-mentioned and other features of the invention are more fully set forth in the following detailed description of a drain valve according to this invention, which description is presented with reference to the accompanying drawing wherein:

FIG. 1 is an elevation view of a drain valve according to this invention mounted to a water conduit of an underground lawn sprinkling system; and FIG. 2 is an enlarged cross-sectional elevation view of the drain valve shown in FIG. 1.

Referring first to FIG. 1, a water distribution conduit or pipe 10 of an underground lawn sprinkling system is shown buried in earth 11 below a lawn 12. The pipe is connected to one arm of an inverted T-fitting 13 which is located at the lowest point in the sprinkling system. A riser tube 14 extends vertically upwardly from the stem of the T-fitting to an upper end disposed at or below the ground surface. A suitable water discharge device or sprinkling head 15, such as a sprinkling head in accord with my prior Patents 2,589,942, 2,954,171, or 3,082,961, is mounted to the upper end of the riser and extends above the surface of the lawn. The pipe, at a location remote from the sprinkling head, is connected to a water supply main (not shown). The liquid flow communication of the pipe to the main is controlled by a suitable valve (not shown).

A drain valve 16 is engaged in the other arm of the T-fitting. The drain valve is disposed in a sump chamber 17 formed in the ground and filled with gravel or coarse sand 18. Preferably the drain valve is located near the upper extent of the sump chamber, and the sump chamber below the drain valve has a volume at least equal to the volume of water required to fill the sprinkling system downstream of the control valve.

As shown in FIG. 2, drain valve 16 includes a cylindrical housing or body 20 having an axial bore or liquid flow passage 21 through it. The passage has an inlet end 22 which opens to an enlarged diameter portion 23 of the passage. The passage enlarged diameter portion terminates in an annular shoulder 24 circumferentially of the passage and spaced along the passage from the inlet end of the passage. The shoulder defines a spherically curved valve seat 25 around the passage; the valve seat has as its axis of revolution the axis of the passage.

Adjacent the inlet end of the passage, the exterior of the housing defines a helical screw thread 26 adapting the housing for connection to pipe 10, with the passage communicating with the interior of the pipe, via T-fitting 13.

A hemispherically curved valve member 28 is disposed in the passage enlarged diameter portion. The valve member is oriented so that it is convex toward the other or outlet end 29 of the passage. The valve member has a curvature which mates with the curvature of the valve seat. The valve member also has a planar end surface 30 disposed normal to the passage axis and opening toward the inlet end of the passage. The maximum diameter of the valve member is greater than the diameter of the passage, but less than the diameter of the enlarged diameter portion of the passage. Alternatively, the valve member and the valve seat may be conical and shaped to mate with each other.

Preferably the housing is fabricated of brass and the valve member is fabricated of an elastomeric material having a hardness of about 90 to 95 Shore. The inlet end of the passage carries a foraminous filter member 32 fabricated of a perforated brass plate secured in place against a peripheral shoulder 33 open to the inlet end of the passage by wedging the housing against the plate. In a presently preferred embodiment of the drain valve, the perforated plate has 324 holes per square inch, each hole being 0.033 inch in diameter. Filter member 32 prevents large grains of sand and the like from entering into the drain valve housing. The material from which the valve member is made is sufficiently soft so that it can deform to accommodate small grains of sand disposed between it and the valve seat and still provide a liquid-tight seal against the valve seat. Preferably, the valve member is formed of a synthetic plastic material having a hardness of about 80 Shore.

At the outlet end of the passage, the housing defines an inwardly extending flange 34 around the passage. A disc of wire mesh screen 35 is disposed across the passage inwardly of the flange to be held secure from axial movement out of the passage by the flange. The screen prevents sand and the like from being washed into the valve from the sump chamber. In the presently preferred embodiment of the drain valve referred to above, the screen is fabricated of wire having a diameter of 0.012 inch and has a mesh size per lineal inch of 30 x 30.

A cylindrical plug 36 is formed integral with the valve member and extends from the valve member axially of passage 21 toward screen 35. The plug has a diameter smaller than the diameter of the passage. The exterior of the plug is forcibly engaged in the small end of a conically tapered, helically wound compression spring 37. The large end of the spring has a diameter slightly less than the diameter of the passage and is abutted against the mesh screen adjacent flange 34. The spring acts against the valve member to urge the valve member away from the valve seat. The spring and the plug cooperate to maintain the valve member in axial alignment with passage 21 and to maintain valve member surface 30 normal to the axis of the passage. The spring, therefore, guides the valve member as the valve member moves toward and away from the valve seat. Accordingly, the valve member cannot become jammed at any position it may occupy relative to the valve seat since the valve member touches the housing only when it is engaged with the valve seat.

The spring is biased so that when the pressure of fluid communicating with the inlet end of the passage is less than about six pounds per square inch greater than the pressure of fluid to which the outlet end of the passage is exposed, the spring is effective to move the valve member away from the valve seat.

The drain valve described above is particularly suited for use in an underground lawn sprinkling system. Such systems are usually coupled to water mains wherein water pressure is maintained at a minimum pressure of about 15 p.s.i.g. At a remote location of the sprinkling system, however, the water pressure may reach a pressure of only about 8–10 p.s.i.g. because of the head loss inherent in the ducts of the system. The pressure in sump chamber 17 may be on the order of 1–1.5 p.s.i.g. where the ground is very wet, although normally atmospheric pressure is present in the sump chamber. Drain valve 16, however, is operational in this environment.

Normally the drain valve is open. When water is supplied to the sprinkling system via the system control valve, the drain valve closes as soon as the pressure of water flowing through the drain valve reaches about 4–5 p.s.i.g.

It is noted here that valve 16 closes at a lower pressure differential than the pressure differential which exists when the valve opens. Also, when the sprinkling system is first operated, the lawn will be dry and thus the pressure in the sump chamber will be atmospheric pressure.) The valve remains closed as long as the sprinkling system is operated. As soon as the sprinkling system control valve is closed, the pressure of the water retained in the conduits of the system falls to substantially atmospheric pressure. This is true whether or not the system control valve is an anti-siphon valve since some air will leak into the conduits through the sprinkler heads. Accordingly, the pressure differential manifested across the closed drain valve falls to a value of less than about six pounds per square inch, and the spring moves the valve member away from the valve seat to open the drain valve.

The drain valve closes in response to a lower water pressure in pipe 10 than the pressure which exists in the pipe when the valve opens. This relation between valve opening and valve closing pressures is attributable to the lift which is produced on the valve member by water flowing through the open drain valve. The upstream side of the valve member is flat, while water flows over the curved surface of the valve member at a relatively high rate through the small annular area between the valve member and the housing. This water flow creates a lift force on the valve member which acts in the direction of valve closure. Accordingly, a static pressure differential of only about 4–5 p.s.i.g. must exist across the valve for the valve member to close against the bias of the spring. Since the control valve for the sprinkling system usually is opened reasonably rapidly, chatter of the drain valve as it closes is not a problem in practice.

The above referred to preferred embodiment of the drain valve has a passage diameter of 0.450 inch, the enlarged diameter portion of the passage has a diameter of 0.600 inch, and the radius of curvature of the seat and the valve member is 0.281 inch, the maximum diameter of the valve member being 0.560 inch. The maximum diameter of the valve seat is 0.475–0.480 inch. Such a drain valve is compact and rugged in construction.

Workers skilled in the art to which this invention relates will appreciate that modifications and alterations in the structure described above may be made without departing from the scope of this invention. The particular drain valve described above and shown in the drawing is merely a presently preferred embodiment of this invention and has been described and illustrated merely for the purposes of example. The foregoing description is not to be regarded as limiting the scope of this invention.

What is claimed is:

1. A drain valve for an underground lawn sprinkling system and the like for draining the system following use of the system and comprising:
   (a) a housing having a flow passage therethrough and an annular spherically curved valve seat circumferentially of the passage opening concave toward one end of the passage having an axis of symmetry aligned with the length of the passage, the passage having a first portion of a first diameter extending from substantially the one end of the passage toward the valve seat and a second portion of second smaller diameter extending from the valve seat toward the passage other end,
   (b) coupling means carried by the housing adapting the housing for connection to a liquid flow conduit with the one end of the passage communicating with the conduit,
   (c) a strainer screen disposed across the passage adjacent each end thereof for preventing the entry of sand particles and the like into the passage,
   (d) a substantially hemispherical valve member of diameter slightly less than the diameter of the passage disposed in the passage between the valve seat and the strainer screen adjacent the one end of the passage oriented convex toward the other end of the passage and movable axially of the passage into and out of sealing engagement with the valve seat, the valve member having a substantially planar surface opposite from the seat disposed substantially normal to the seat axis of symmetry and extending across substantially the diameter of the valve member,
   (e) a coil spring engaged between the valve member and the housing for urging the valve member away from the valve seat when the static pressure of a fluid communicated with the one end of the passage is less than a predetermined amount greater than the static pressure of a fluid communicated with the other end of the passage and for guiding movement of the valve member toward and away from the valve seat to assure passage sealing seating of the valve member with the seat when the static pressure of a fluid communicated with the one end of the passage is slightly less than the pressure differential productive of movement of the valve member away from the seat.

2. A drain valve according to claim 1 wherein the valve member carries a projection extending from the hemispherically curved surface of the valve member axially of the passage toward said other end of the passage and the spring is connected to the projection so that the valve member is maintained in a selected relation to the spring, and the spring is arranged to guide the valve member during movement of the valve member toward and away from the valve seat so that the valve member engages the housing only at the valve seat.

3. A drain valve according to claim 2 wherein the coil spring is connected to the valve member by engagement of one end of the spring about the circumference of the projection.

4. A drain valve according to claim 3 wherein the value of the predetermined pressure difference is about six pounds per square inch.

5. A drain valve according to claim 3 wherein the housing is fabricated of a material substantially harder than the material from which the valve member is fabricated.

References Cited
UNITED STATES PATENTS

| | | | |
|---|---|---|---|
| 1,001,510 | 8/1911 | Curbey | 137—517 |
| 1,156,274 | 8/1915 | Cormeny | 137—550 XR |
| 1,897,572 | 2/1933 | Cornell | 137—550 XR |
| 2,077,040 | 4/1937 | Creveling | 137—543.17 XR |
| 2,106,671 | 1/1938 | Watson. | |
| 2,375,498 | 5/1945 | Seymour | 137—513.7 |
| 2,495,754 | 1/1950 | Nance | 137—545 XR |
| 2,600,554 | 6/1952 | Lyons | 137—543.17 XR |
| 2,888,034 | 5/1959 | Glegg | 251—368 XR |
| 3,234,961 | 2/1966 | Arnes | 137—517 |

HENRY T. KLINKSIEK, *Primary Examiner.*